United States Patent [19]

Kooketsu

[11] Patent Number: 5,017,001
[45] Date of Patent: May 21, 1991

[54] FRONT LENS FOR SUNGLASSES

[76] Inventor: Norio Kooketsu, 6 Senjudookitamachi 1-chome, Gifushi, Gifuken, Japan

[21] Appl. No.: 428,499
[22] Filed: Oct. 27, 1989
[51] Int. Cl.$^5$ ............................ G02C 9/00; G02C 7/08
[52] U.S. Cl. .......................................... 351/86; 351/47; 351/57
[58] Field of Search ........................ 351/47, 52, 57, 58, 351/59, 86

[56] References Cited

U.S. PATENT DOCUMENTS

| | | | |
|---|---|---|---|
| 1,588,685 | 6/1926 | Orriss | 351/47 |
| 1,610,043 | 12/1926 | Fillion | 351/47 |
| 1,620,569 | 3/1927 | Quick | 351/47 |
| 1,710,245 | 4/1929 | Schryver | 351/47 |
| 2,759,394 | 8/1956 | Evans | 351/47 |
| 3,600,069 | 8/1971 | McNeill | 351/47 |

FOREIGN PATENT DOCUMENTS 0979220  1/1949  France ................................. 351/47

Primary Examiner—Rodney B. Bovernick
Attorney, Agent, or Firm—Robert E. Burns; Emmanuel J. Lobato

[57] ABSTRACT

Individual lenses of subsidiary glasses, such as sun glasses, are attached to lenses of ordinary glasses by means of three fasteners, each in the shape of a square arch, made of synthetic resin and each provided, at about the middle of the arch, with an inner projection to form front and rear fitting portions at the front and rear sides of the projections respectively. The three fasteners are fitted respectively, with the front fitting portions, in three grooves provided in the periphery of the subsidiary lens and secured in place. The grooves are located so that lines connecting them form a triangle, with the distance between upper and lower fasteners located near the bridge of the ordinary glasses being larger than the outside diameter, in a vertical direction, of the ordinary glasses. This permits the lens of the subsidiary glasses to be fitted and removed from the lens of ordinary glasses in a direction transverse thereto.

3 Claims, 5 Drawing Sheets

FIG. 8(III)
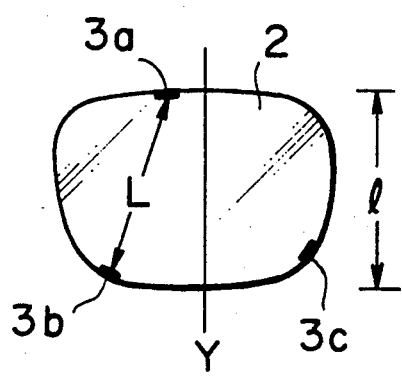

FRONT LENS FOR SUNGLASSES

BRIEF SUMMARY OF THE INVENTION

The present invention relates to a front lens for sunglasses or subsidiary uses which people who usually wear nearsighted, astigmatic or farsighted eyeglasses fit to the front of the lens frame of ordinary glasses.

Front lenses for subsidiary uses are divided into convex lenses fitted to the front of nearsighted eyeglasses for ordinary use and concave lenses fitted to the front of farsighted eyeglasses for ordinary use. Particularly the invention relates to a front lens used separately on the left and right sides of the ordinary eyeglasses.

Conventional front lenses A are constructed as shown in FIGS. 10 and 12. Namely, a pair of lenses B, left and right, are connected by a shaft C, which is rotatably fitted to a front lens bridge D so that the lenses B can be moved up and down. To the front left and right sides of the lower surface of the bridge D are fitted metallic supporting springs E, which exert elasticity in the transverse direction. The lower end of the supporting spring is bent to form an engaging portion F which engages with the lens frame b of ordinary eyeglasses a. Moreover, projections G is provided at the rear left and right sides of the lower surface of the bridge D. At the time of use of front lenses A, they are fitted to the ordinary eyeglasses a in the following ways. As shown in FIG. 11, the front lenses A are fitted across the bridge d or lens frames b of the ordinary eyeglasses a by means of the supporting springs E and projections G of the front lenses A, and the engaging portions F of the supporting springs E are engaged with the lower parts of the left and right lens frames b of the ordinary eyeglasses a by utilizing the elasticity of the supporting springs E. Thus the front lenses A can be moved up and down with the shaft C as the center, when necessary, on the front of the lens frames b.

The conventional front lenses, however, have the following drawbacks. Namely, the left and right supporting springs E are metallic and their engaging portions F come into contact with the lenses e of the ordinary eyeglasses a.

Therefore, long-time use of the front lenses A or repeated fitting and removal of them from the ordinary eyeglasses a or vibrations of the front lenses A relative to the ordinary eyeglasses a, which result from the body movement of the user, will cause the engaging portions F to give fine abrasions to the lenses e of the ordinary eyeglasses a. Further, when the lenses e of the ordinary eyeglasses a are bifocal lenses each comprising a convex lens portion and a concave lens portion in the upper and lower parts thereof, respectively, fine abrasions existing on the lenses e will worsen the field of vision of the user when he moves the pupils of his eyes down to look at a nearby object through the lower, concave lens portions of the bifocal lenses or will cause discomfort to the user when he is looking at an object.

Moreover, the conventional front lenses consist of a pair of lenses, left and right, which are mechanically connected by a bridge D. Recently lens frames for ordinary eyeglasses are available in a great variety of sizes and shapes, so it is difficult to select front lenses which are suitable for the bridge d and lens frames b of the ordinary eyeglasses a. Therefore, retailers of eyeglasses can hardly meet the needs of their customers.

Furthermore, as the left and right lenses B for front lenses A are connected by a bridge D, one of them, when broken or damaged, cannot be repaired by retailers at their shops and the remaining one cannot be reused and has to be discarded.

It is the first object of the present invention to ensure wearing ordinary eyeglasses comfortably without causing damage to their lenses, irrespective of how often the front lenses are fitted to and removed from the ordinary eyeglasses for a long period of time. It is the second object of the invention to make it easy for retailers to repair the damaged lenses at their shops so that they can meet customers' needs. It is the third object of the invention to ensure economical use of the front lenses.

BRIEF DESCRIPTION OF THE DRAWINGS

FIG. 8 (I) shows a Boston type lens frame, (II) a round type lens frame, (III) a Wellington type lens frame and (IV) an auto type lens frame.

FIG. 9 is a perspective view of the conventional front lens when viewed from the rear side.

FIG. 10 is an expanded perspective view of the major elements of the front lens fitted to ordinary eyeglasses.

FIG. 11 is an expanded perspective view of the major elements of the front lens fitted to ordinary eyeglasses when viewed from the front side.

FIG. 12 is an expanded view showing the state of FIG. 10 when viewed from the rear side.

DETAILED DESCRIPTION OF THE INVENTION

Figure 1:
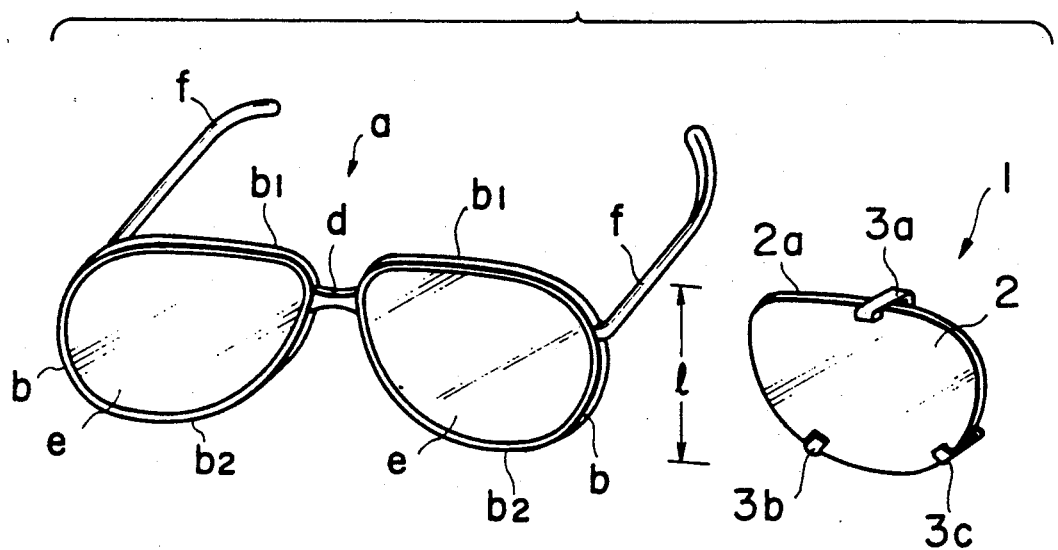
FIG. 1 is a perspective view showing the state in which front lenses are fitted to ordinary eyeglasses.
Figure 2:
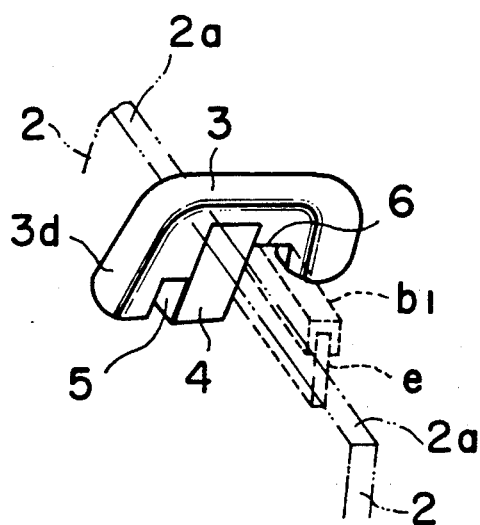
FIG. 2 is a perspective view showing a fastener.
Figure 3:
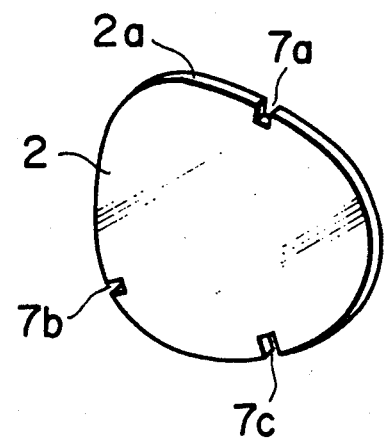
FIG. 3 is a perspective view showing a front lens having grooves on its peripheral edge.
Figure 4:
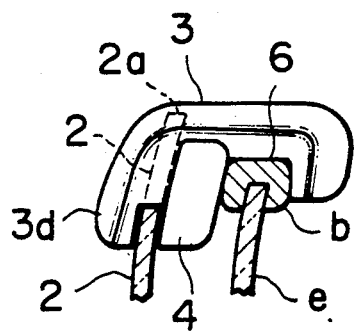
FIG. 4 is a side view of the front lens fitted to ordinary eyeglasses, in which the lens and eyeglasses are shown in section.
Figure 5:
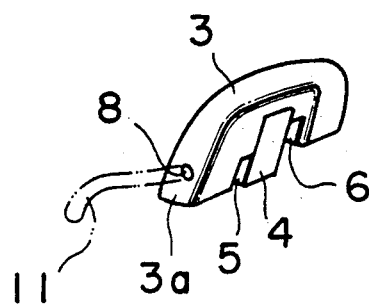
FIG. 5 is a perspective view showing a core material passed through the fastener.
Figure 6:
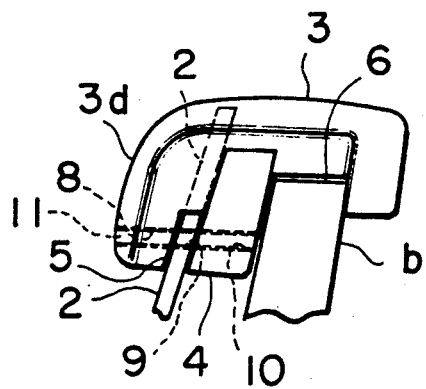
FIG. 6 is a side view showing the state in which the front lens fixed to the fastener through the core material is fitted to the ordinary eyeglasses.

The following detailed description refers to like parts with like symbols in FIGS. 1 through 12. The front lens 1 for sunglasses or subsidiary uses for users of ordinary eyeglasses comprises a lens 2 and a plurality of fasteners 3.

The lens 2 for sunglasses is composed of a synthetic resin texture which is colored with no index of light refraction and highly pervious to light. The lens 2 for subsidiary uses, which is fitted to the front of ordinary eyeglasses, is composed of a synthetic resin texture which is transparent and has an index of refraction for long or short sight.

The fastener 3 is formed of a soft synthetic resin in the shape of a square arch. A projection 4 is provided at about the middle of the inner recess of the fastener 3. A front fitting portion 5, which can clip the lens 2, is provided at the front side of the inner recess and a rear fitting portion 6, which can clip the lens frame b of the ordinary eyeglasses a, is provided at the rear side.

Three fasteners 3a, 3b and 3c each having the above-mentioned construction are arranged on the peripheral edge 2a of the lens 2. On the other hand, grooves 7a, 7b and 7c are provided on the peripheral edge 2a of the lens 2 where the fasteners 3a, 3b and 3c are fixed. And the front fitting portions 5 of the fasteners 3 are fitted to the grooves 7a, 7b and 7c provided on the peripheral edge 2a of the lens 2.

Figure 7:
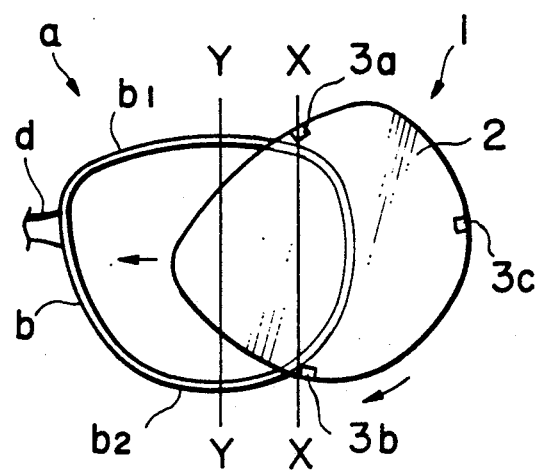
FIG. 7 is a front view showing the state in which the front lens of the present invention is removed from one of the lens frames of the ordinary eyeglasses.
Figure 8I:
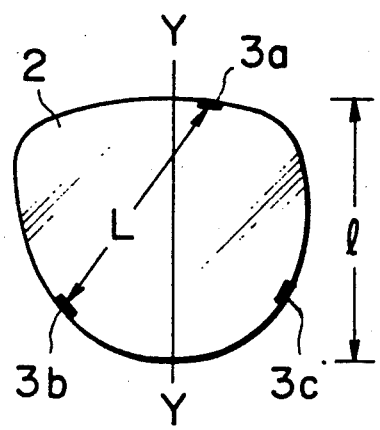
FIGS. 8 (I) to 8 (IV) show front views of various lens frames for ordinary eyeglasses, illustrating the relation between the outside diameter of the lens frame and the distance between the two fasteners of the front lens.
Figure 8:
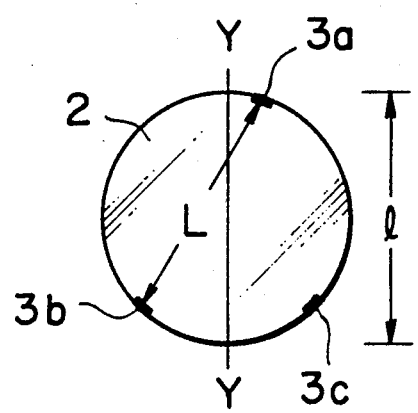
Figure 8:
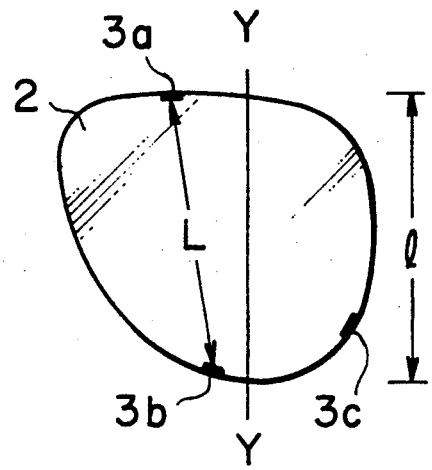
Figure 9:
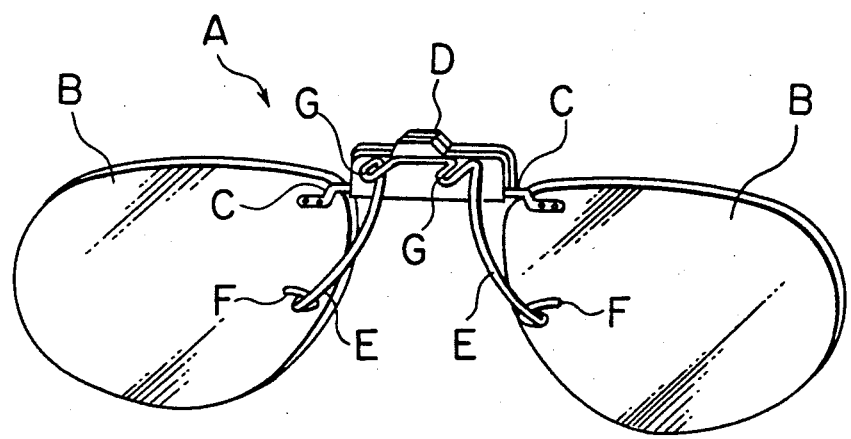
FIGS. 9 to 12 each show conventional front lens.
Figure 10:
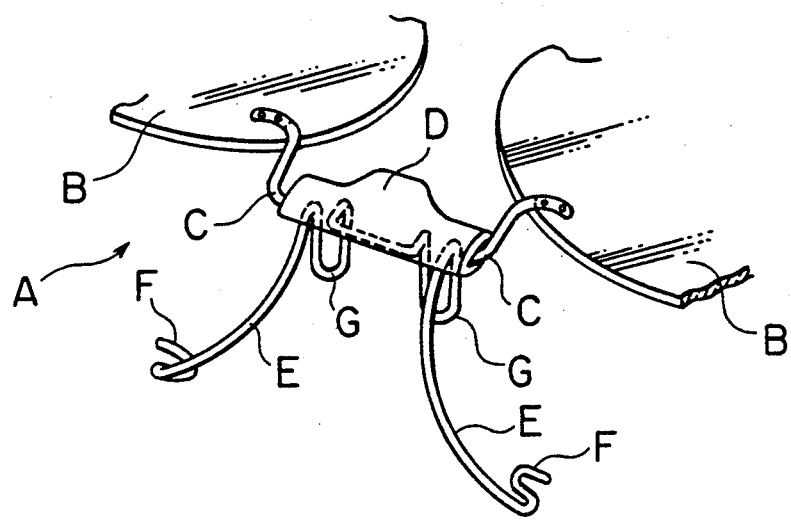
Figure 11:
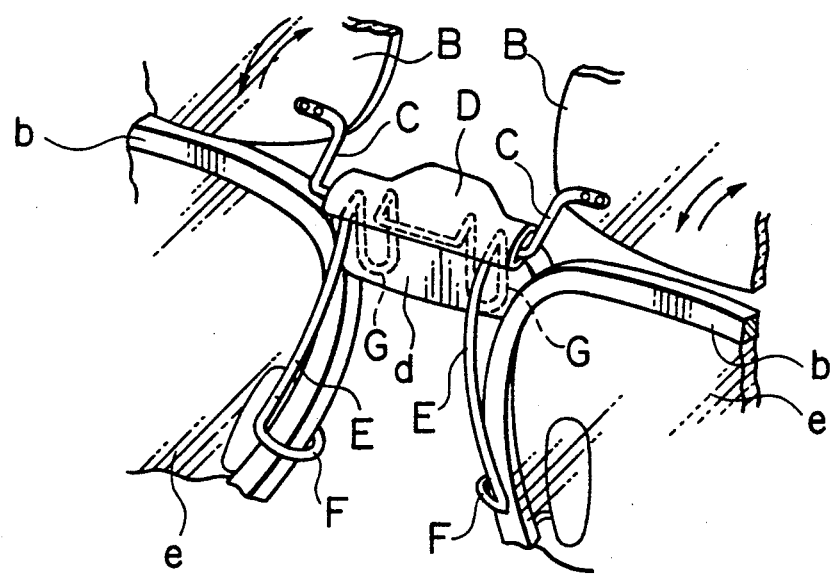
Figure 12:
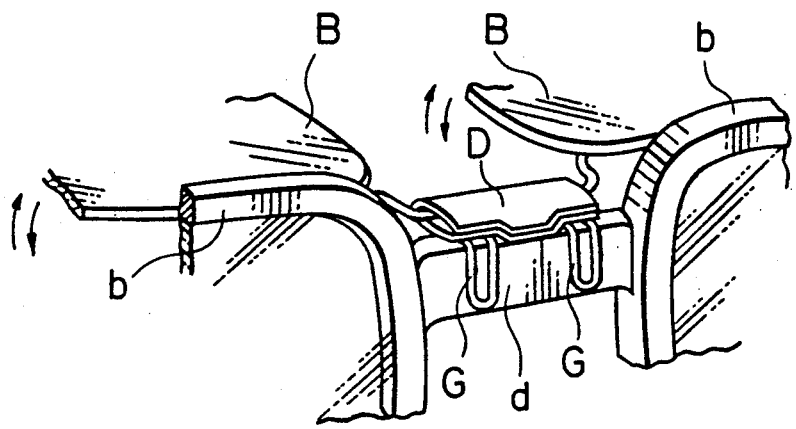

The locations of the three fasteners 3a, 3b and 3c and the grooves 7a, 7b and 7c on the peripheral edge 2a of the lens 2 are described below. Namely, the distance L between the two fasteners 3a and 3b, upper and lower, which are located near the bridge d of the ordinary eyeglasses a when the lens 2 is fitted to the ordinary eyeglasses a, is a little larger than the outside diameter l in the vertical direction of the lens frame b of the ordinary eyeglasses a. As shown in FIG. 7, the upper fastener 3a is brought into contact with the lens frame b and the lens 2 is positioned so as to be able to be fitted to or removed from the lens frame b with the fastener 3a as the supporting point.

The remaining fastener 3c is placed at a position such that the lines connecting this fastener 3c with the two fasteners 3a and 3b can form a triangle.

There are two methods of fixing each fastener 3 to the lens 2. The first method applies an adhesive to the inner surface of the front fitting portion 5 of the fastener 3 and fits and fixes the fastener 3 to groove 7a, 7b or 7c on the peripheral edge 2a of the lens 2. The second method makes holes 8, 9 and 10 in the front portion 3d and projection 4 of the fastener 3 and the fastener fixing porition of the peripheral edge 2a of the lens 2, respectively. The fastener 3 is fixed to the lens 2 in the following ways. Namely, a very thin wire-like core material 11 is passed through the holes 8, 9 and 10 and is fixed by applying a transparent liquid adhesive to the front portion 3d of the fastener 3 and the section of the core material 11. Alternatively, a core material whose diameter is a little larger than the diameters of the holes 8, 9 and 10 is prepared and is forced into the holes so as not to come out.

As the present invention has been constructed as described above, one each front lens 1 is fitted to the left and right lens frames b of the ordinary eyeglasses a. The user of the ordinary eyeglasses a fits a front lens 1 to one of the lens frames b in the following ways. As shown in FIG. 7, first at the front side of one of the lens frames b of the ordinary eyeglasses a the rear fitting portion 6 of the upper fastener 3a of the lens 2 is brought into contact with the portion, close to the temple f, of the upper edge b1. Afterward, the lens 2 is rotated with the fastener 3a as the supporting point. Next the rear fitting portion 6 of the lower fastener 3b at one side of the lens 2 is fitted to the portion, close to the temple f, of the lower edge b2 of the lens frame b and the lens 2 is positioned so that the straight line X connecting the upper fastener 3a to the lower fastener 3b is parallel to the longest straight line Y in the vertical direction of the lens frame b. Then the lens 2 is moved parallel toward the bridge d of the ordinary eyeglasses a. Thus the front lens 1 is fitted to the ordinary eyeglasses a, i.e., it is superposed on the front of the lens e, and the rear fitting portion 6 of the lower fastener 3c at the other side of the front lens 1 is fitted to the portion, close to the temple f, of the lower edge b2 of the lens frame b. Following these steps, the front lens 1 can be fitted to the lens e of the ordinary eyeglasses a, parallel to it, in the direction virtually transverse to one of the lens frames b of the ordinary eyeglasses a.

The front lens 1 is removed in the following ways.

Namely, by applying some amount of rotating force to the peripheral edge 2a of the lens 2 parallel to the lens e and in the direction opposite to the direction in which the lens 2 is fitted with the fastener 3a as the supporting point, i.e. in the direction to the temple f, the lens 2 is rotated until the straight line X connecting the fasteners 3a and 3b becomes parallel to the longest straight line Y in the vertical direction of the lens frame b. Then the front lens 1 is pulled in the transverse direction to remove it from the lens frame b. Another front lens 1 is fitted to and removed from the other lens frame b of the ordinary eyeglasses a following the same steps as described above.

According to this invention, the fasteners 3 are formed of a synthetic resin, therefore, the front lenses 1 kept fitted to the ordinary eyeglasses a for a long period of time will not cause damage to the lenses e of the ordinary eyeglasses a. Particularly in the case that the lenses fitted to the ordinary eyeglasses are bifocal, anything located nearby can be looked at comfortably through the concave lens portions of the lenses because there are no fine traces of damage on these portions.

The fasteners 3 are arranged on the peripheral edge 2a of the lens 2 so that the lines connecting them form a triangle and the distance L between the upper (3a) and lower (3b) fasteners located near the bridge d of the ordinary eyeglasses a is a little larger than the outside diameter l in the vertical direction of the lens frame b of the ordinary eyeglasses a, thereby the front lens 1 can be fitted to and removed from the eyeglasses a in the direction transverse to the lens frame b. Therefore, the front lenses can easily be fitted to and removed from the eyeglasses a. Moreover, different from the conventional front lenses connected by a bridge D, the left and right lenses 1 are separately fitted to and removed from the left and right lens frames b of the ordinary eyeglasses a. Therefore, if one of the front lenses, when damaged, is replaced with a new one, the other need not be discarded and can be reused, which is beneficial from the economical viewpoint. Furthermore, if retailers, who sell eyeglasses directly to consumers, possess a synthetic resin texture for lenses 2 as is the case with ordinary lenses, cut the resin texture into pieces conforming to the size and shape of the lens frames of the ordinary eyeglasses customers wear, grind the peripheral edge of each such piece, arrange three fasteners 3 on the peripheral edge and fix them to it, they can easily provide front lenses at their shops, responding to customers' needs.

I claim:

1. A front lens (1) for sunglasses or subsidiary uses which comprises a lens (2) composed of a synthetic resin and three fasteners each formed of a synthetic resin in the shape of an arch, an inner projection (4) made of a synthetic resin being provided at about the middle of each fastener (3) to form a front (5) and a rear (6) fitting portions at the front and rear of said projection (4), respectively, three grooves (7a, 7b and 7c) being provided on the peripheral edge (2a) of the lens frame (2) and three fasteners (3a, 3b and 3c) being fitted to said grooves (7a, 7b and 7c) so that the lines connecting said fasteners form a triangle and the distance (L) between the upper (3a) and lower (3b) fasteners located near the bridge (d) of ordinary eyeglasses (a) is larger than the outside diameter (l) in the vertical direction of the lens frame (b) of the ordinary eyeglasses (a), and means securing said fasteners to said lens (2), whereby the lens (2) can be fitted to and removed from the lens frame b of the ordinary eyeglasses (a) in the direction transverse thereto, and the front fitting portions (5) of the respective fasteners (3) being fitted and fixed to the grooves (7a, 7b and 7c) on the peripheral edge (2a) of the lens (2).

2. A front lens (1) according to claim 1, wherein holes (8, 9 and 10) are provided in the front portion (3d) of each frastener (3), the peripheral edge (2a) and the projection (4) of the lens (2), respectively, wherein said means for securing said fasteners to said lens (2) comprises a core material (11) passed through said holes (8, 9 and 10) to fix said fasteners (3) to the lens (2).

3. A front lens according to claim 1, wherein said means for securing said fasteners to said lens (2) comprised adhesive applied to inner surfaces of said front fitting portions of said respective fasteners.

* * * * *